US009496083B2

(12) United States Patent
Lee et al.

(10) Patent No.: US 9,496,083 B2
(45) Date of Patent: Nov. 15, 2016

(54) WIRELESS POWER TRANSMITTER, WIRELESS POWER RECEIVER, AND METHODS OF CONTROLLING THE SAME

(71) Applicant: Samsung Electronics Co., Ltd., Gyeonggi-do (KR)

(72) Inventors: Kyung-Woo Lee, Seoul (KR); Hyuk-Choon Kwon, Seoul (KR); Kang-Ho Byun, Gyeonggi-do (KR); Hae-Young Jun, Gyeonggi-do (KR); Hee-Won Jung, Gyeonggi-do (KR); Joon-Il Kim, Seoul (KR); Se-Ho Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 501 days.

(21) Appl. No.: 13/941,048

(22) Filed: Jul. 12, 2013

(65) Prior Publication Data

US 2014/0015335 A1 Jan. 16, 2014

Related U.S. Application Data

(60) Provisional application No. 61/670,779, filed on Jul. 12, 2012.

(30) Foreign Application Priority Data

Jul. 30, 2012 (KR) .......................... 10-2012-0083340

(51) Int. Cl.
*H01F 38/14* (2006.01)
*H01F 27/42* (2006.01)
(Continued)

(52) U.S. Cl.
CPC ............. *H01F 38/14* (2013.01); *H02J 7/0004* (2013.01); *H02J 7/025* (2013.01)

(58) Field of Classification Search
CPC ........ H01F 38/14; H02J 7/0004; H02J 7/025
USPC .......................................................... 307/104
See application file for complete search history.

(56) References Cited

U.S. PATENT DOCUMENTS 8,039,995 B2 * 10/2011 Stevens .................. H02J 5/005
307/104
2007/0228833 A1 10/2007 Stevens et al.
(Continued)

FOREIGN PATENT DOCUMENTS

| CN | 1954472 | 4/2007 |
|---|---|---|
| CN | 102097668 | 6/2011 |

(Continued)

OTHER PUBLICATIONS

Kuyvenhoven et al., "Development of a Foreign Object Detection and Analysis Method for Wireless Power Systems", 2011 IEEE Symposium on Product Compliance Engineering, Oct. 10-12, 2011, pp. 1-6.*

(Continued)

*Primary Examiner* — Hal Kaplan
(74) *Attorney, Agent, or Firm* — The Farrell Law Firm, P.C.

(57) ABSTRACT

A wireless power transmitter, a wireless power receiver, and methods of controlling the same are provided. A method of detecting a rogue device other than a wireless power receiver in the wireless power transmitter includes receiving power consumption information about the wireless power receiver from the wireless power receiver, calculating a power loss based on the received power consumption information about the wireless power receiver, determining whether the power loss exceeds a threshold, and controlling transmission power of the wireless power transmitter, determining that a rogue device exists on the wireless power transmitter, if the power loss exceeds the threshold.

30 Claims, 9 Drawing Sheets

(51) Int. Cl.
*H01F 37/00* (2006.01)
*H02J 7/00* (2006.01)
*H02J 7/02* (2016.01)

(56) References Cited

U.S. PATENT DOCUMENTS

| | | |
|---|---|---|
| 2009/0322158 A1* | 12/2009 | Stevens .................. H02J 5/005 307/104 |
| 2010/0156343 A1 | 6/2010 | Jung |
| 2011/0115432 A1 | 5/2011 | El-Maleh et al. |
| 2011/0196544 A1 | 8/2011 | Baarman et al. |
| 2013/0026851 A1 | 1/2013 | Taguchi |
| 2013/0094598 A1* | 4/2013 | Bastami .................. H02J 5/005 375/259 |
| 2013/0099732 A1 | 4/2013 | Lee et al. |
| 2014/0077615 A1 | 3/2014 | Stevens et al. |

FOREIGN PATENT DOCUMENTS

| | | |
|---|---|---|
| EP | 2 372 863 | 10/2011 |
| KR | 1020110107960 | 10/2011 |
| KR | 1020110131954 | 12/2011 |
| KR | 1020120077448 | 7/2012 |
| WO | WO 2011/128969 | 10/2011 |

OTHER PUBLICATIONS

Chinese Office Action dated Apr. 25, 2016 issued in counterpart application No. 201380037107.7, 13 pages.

European Search Report dated May 2, 2016 issued in counterpart application No. 13816377.9-1804, 7 pages.

* cited by examiner

WIRELESS POWER TRANSMITTER, WIRELESS POWER RECEIVER, AND METHODS OF CONTROLLING THE SAME

PRIORITY

This application claims priority under 35 U.S.C. §119(a) to a U.S. provisional application filed on Jul. 12, 2012 in the U.S. Patent and Trademark Office and assigned Ser. No. 61/670,779 and a Korean patent application filed on Jul. 30, 2012 in the Korean Intellectual Property Office and assigned Serial No. 10-2012-0083340, the contents of each of which are incorporated herein by reference.

BACKGROUND OF THE INVENTION

1. Field of the Invention

The present invention relates generally to a wireless power transmitter, a wireless power receiver, and methods of controlling the same, and more particularly, to a wireless power transmitter and a wireless power receiver which can communicate in a predetermined scheme, a method of controlling the wireless power transmitter, and a method of controlling the wireless power receiver.

2. Description of the Related Art

In view of their nature, mobile terminals, such as portable phones and Personal Digital Assistants (PDAs), are powered by rechargeable batteries. To charge the batteries, the mobile terminals supply electric energy to the batteries through additional chargers. Typically, the charger and the battery each have an exterior contact terminal and thus are electrically connected to each other through their contact terminals.

This contact-based charging scheme faces the problem of vulnerability of contact terminals to contamination of rogue devices and to moisture exposure, and the resulting unreliable battery charging due to the outward protrusion of the contact terminals.

To address the above problems, wireless charging or contactless charging technologies have recently been developed and applied to many different electronic devices.

A wireless charging technology is based on wireless power transmission and reception. For example, a portable phone battery is automatically charged when placed on a charging pad, without being connected to an additional charging connector. The use of the wireless charging technology is well known in a wireless electric toothbrush or a wireless electric shaver. The wireless charging technology improves a waterproof function since it wirelessly charges the electronic devices, and improves the portability of the electronic devices because it does not require a wired charger. It is expected that the development of technologies related to the wireless charging technology will be significantly furthered in the coming age of electric cars.

The three wireless charging schemes generally are electromagnetic induction using coils, resonance-based, and Radio Frequency (RF)-microwave radiation based on conversion of electric energy to microwaves.

The electromagnetic induction-based wireless charging scheme has been the most popular, to this point. However, considering recent successful experiments in wireless power transmission over microwaves at a distance of tens of meters in Korea and other overseas countries, it is foreseeable that every electronic product will be charged cordlessly at any time in any place in the near future.

Electromagnetic induction-based power transmission means power transfer between primary and secondary coils. Current is induced when a magnet moves through a coil. Based on this principle, a transmitter creates a magnetic field and a receiver produces energy by current induced by a change in the magnetic field. This phenomenon is known as magnetic induction, and power transmission based on magnetic induction is highly efficient in energy transfer.

Regarding resonance-based wireless charging, in 2005, a system that enables wireless energy transfer from a charger at a distance of a few meters based on the resonance-based power transmission principle by the Coupled Mode Theory was disclosed. This wireless charging system employs the physics concept of resonance, by which when a tuning fork oscillates at a particular frequency, a wine glass next to the tuning fork will oscillate at the same frequency. An electromagnetic wave containing electrical energy was caused to resonate instead of causing sound to resonate. The resonant electric energy is directly transferred only in the presence of a device having the same resonant frequency, while the unused electric energy is reabsorbed into the electromagnetic field rather than being dispersed into the atmosphere. Thus, the resonant electric energy does not affect nearby machines or human bodies, compared to other electronic waves.

Wireless charging is a recent active research area. However, there are no specified standards of wireless charging priority, detection of a wireless power transmitter/receiver, communication frequency selection between a wireless power transmitter and a wireless power receiver, wireless power control, selection of a matching circuit, and allocation of a communication time to each wireless power receiver in a single charging cycle.

Accordingly, there exists a need for developing standards regarding a method of detecting rogue devices on a wireless power transmitter by the wireless power transmitter and a configuration of transmitting related information in a wireless power receiver.

SUMMARY OF THE INVENTION

Aspects of the present invention are to address at least the above-mentioned problems and/or disadvantages and to provide at least the advantages described below. Accordingly, an aspect of the present invention is to provide standards of overall operations of a wireless power transmitter and a wireless power receiver, particularly an overall configuration and procedure of detecting a rogue device in a wireless power transmitter.

In accordance with an aspect of the present invention, a method of detecting a rogue device other than a wireless power receiver in a wireless power transmitter includes receiving power consumption information about the wireless power receiver from the wireless power receiver, calculating a power loss based on the received power consumption information about the wireless power receiver, determining whether the power loss exceeds a threshold, controlling transmission power of the wireless power transmitter, and determining that a rogue device exists on the wireless power transmitter, if the power loss exceeds the threshold.

In accordance with another aspect of the present invention, a wireless power transmitter of detecting a rogue device other than a wireless power receiver includes a communication unit configured to receive power consumption information about the wireless power receiver from the wireless power receiver, and a controller configured to calculate a power loss based on the received power consumption information about the wireless power receiver, to determine whether the power loss exceeds a threshold, and to determine that a rogue device exists on the wireless power transmitter, if the power loss exceeds the threshold.

In accordance with another aspect of the present invention, a method of controlling a wireless power transmitter that transmits a charging power to a wireless power receiver includes detecting existence of the wireless power receiver by applying a search power to the wireless power receiver, the search power being used to detect the existence of the wireless power receiver, transmitting a driving power to the wireless power receiver to drive the wireless power receiver, determining whether to join the wireless power receiver in a wireless power network and joining the wireless power receiver in the wireless power network based on a determination result, transmitting a charging power to the wireless power receiver, and determining whether there is a rogue device other than the wireless power receiver.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the invention. In addition, descriptions of well-known functions and constructions is omitted for the sake of clarity and conciseness.

The terms and words used in the following description and claims are not limited to their dictionary meanings, but, are merely used by the inventor to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "substantially" indicates that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present invention will be provided to achieve the above-described technical aspects of the present invention. In an implementation, defined entities may have the same names, to which the present invention is not limited. Thus, embodiments of the present invention can be implemented with same or ready modifications in a system having a similar technical background.

Figure 1:
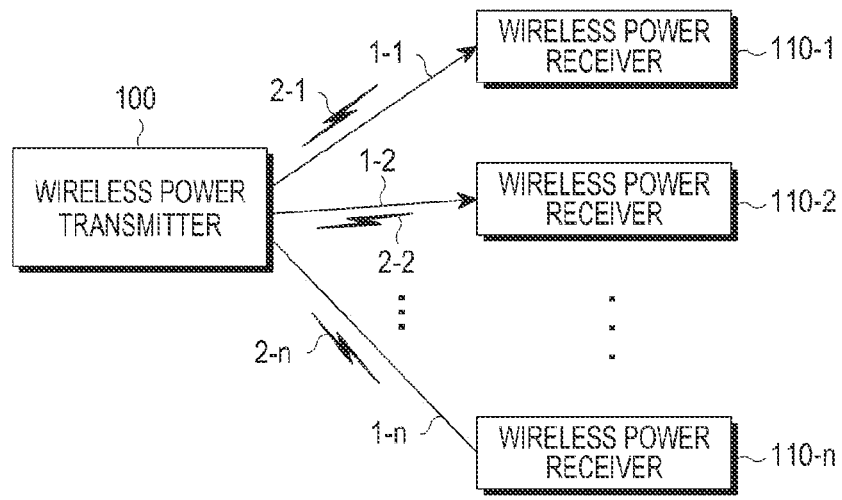
FIG. 1 illustrates an operation of a wireless charging system.

FIG. 1 illustrates an operation of a wireless charging system. Referring to FIG. 1, the wireless charging system includes a wireless power transmitter 100 and one or more wireless power receivers 110-1 to 110-n.

The wireless power transmitter 100 transmits power 1-1 to 1-n wirelessly to the wireless power receivers 110-1 to 110-n. Specifically, the wireless power transmitter 100 transmits the power 1-1 to 1-n only to wireless power receivers authenticated in an authentication procedure.

The wireless power transmitter 100 establishes electrical connections with the wireless power receivers 110-1 to 110-n. For example, the wireless power transmitter 100 transmits wireless power in electromagnetic waveforms to the wireless power receivers 110-1 to 110-n.

The wireless power transmitter 100 conducts bi-directional communication with the wireless power receivers 110-1 to 110-n. The wireless power transmitter 100 and the wireless power receivers 110-1 to 110-n process and transmit/receive packets 2-1 to 2-n in predetermined frames. The frames will be described later in greater detail. The wireless power receivers 110-1 to 110-n are, for example, mobile communication terminals, Personal Digital Assistants (PDAs), Portable Multimedia Players (PMPs), and smartphones for example.

The wireless power transmitter 100 supplies power wirelessly to the plurality of wireless power receivers 110-1 to 110-n, such as by resonance. If the wireless power transmitter 100 uses a resonance-based wireless power transmission scheme, the distances between the wireless power transmitter 100 and the plurality of wireless power receivers 110-1 to 110-n are preferably 30 m or shorter. If the wireless power transmitter 100 uses an electromagnetic induction-based wireless power transmission scheme, the distances between the wireless power transmitter 100 and the plurality of wireless power receivers 110-1 to 110-n are preferably 10 cm or shorter.

The wireless power receivers 110-1 to 110-n receives wireless power from the wireless power transmitter 100 and charges their internal batteries with the wireless power. In addition, the wireless power receivers 110-1 to 110-n transmit to the wireless power transmitter 100 a signal requesting wireless power transmission, information needed for wireless power reception, information indicating the states of the wireless power receivers 110-1 to 110-n, and/or control information about the wireless power transmitter 100, which are described later in greater detail herein.

Each of the wireless power receivers 110-1 to 110-n transmits a message indicating its charged state to the wireless power transmitter 100.

The wireless power transmitter 100 includes a display unit and thus displays the state of each of the wireless power receivers 110-1 to 110-n based on a message received from the wireless power receiver. The wireless power transmitter 100 displays an estimated time left to finish charging of each of the wireless power receivers 110-1 to 110-n.

The wireless power transmitter 100 transmits a control signal to each of the wireless power receivers 110-1 to 110-n in order to disable the wireless charging function of the wireless power receiver. Upon receipt of the control signal that disables the wireless charging function, the wireless power receiver disables its wireless charging function.

Figure 2A:
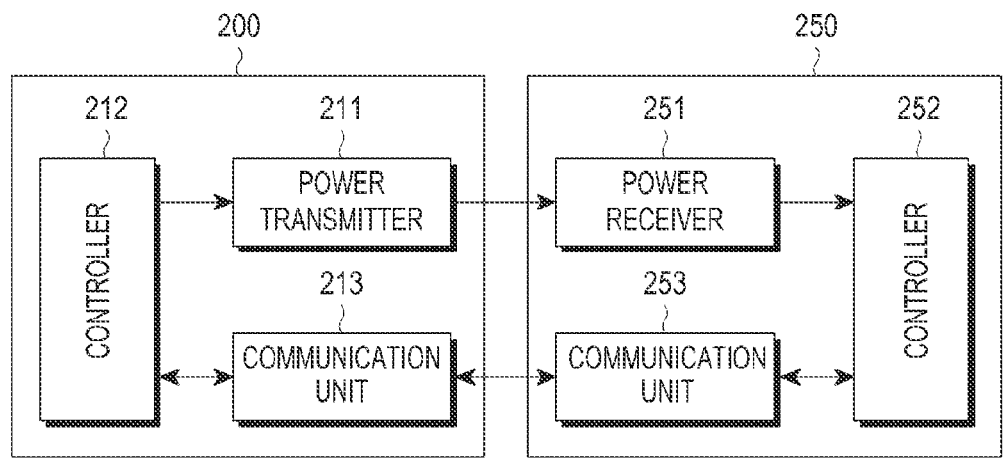
FIG. 2A illustrates a wireless power transmitter and a wireless power receiver according to an embodiment of the present invention.

FIG. 2A illustrates a wireless power transmitter and a wireless power receiver according to an embodiment of the present invention.

Referring to FIG. 2A, a wireless power transmitter 200 includes a power transmitter 211, a controller 212, and a communication unit 213. A wireless power receiver 250 includes a power receiver 251, a controller 252, and a communication unit 253.

The power transmitter 211 supplies power requested by the wireless power transmitter 200 and supplies power wirelessly to the wireless power receiver 250. The power transmitter 211 supplies power in an Alternate Current (AC) waveform, or may convert the power in a Direct Current (DC) waveform to an AC waveform through an inverter and then supply the power in the AC waveform. The power transmitter 211 is configured as a built-in battery or a power reception interface that receives external power and supplies the power to other components. It will be readily understood to those skilled in the art that any means could be used as the power transmitter 211, so long as it supplies power in a predetermined AC waveform.

The power transmitter 211 further provides AC waves in the form of electromagnetic waves to the wireless power receiver 250. The power transmitter 211 further includes a loop coil to transmit and receive electromagnetic waves. If the power transmitter 211 is configured to include a loop coil, the inductance L of the loop coil is changed. It will be readily understood to those skilled in the art that any means could be used as the power transmitter 211, so long as it transmits and receives electromagnetic waves.

The controller 212 provides overall control to the wireless power transmitter 200. The controller 212 controls the operations of the wireless power transmitter 200 using a control algorithm, program or application required for control, read from a memory (not shown). The controller 212 is configured as a Central Processing Unit (CPU), a microprocessor, or a mini-computer, for example. The operation of the controller 212 will be described later in greater detail.

The communication unit 213 communicates with the wireless power receiver 250 in a communication scheme. The communication unit 213 communicates with the communication unit 253 of the wireless power receiver 250 by Near Field Communication (NFC), Bluetooth®, Bluetooth® Low Energy (BLE), Wireless Fidelity (Wi-Fi), Wi-Fi Direct, Zigbee®, infrared communication, or visible ray communication, for example. In accordance with an embodiment of the present invention, the communication unit 213 may operate in conformance to Zigbee® of Institute of Electrical and Electronics Engineers (IEEE) 802.15.4. The communication unit 213 may use a Carrier Sense Multiple Access with Collision Avoidance (CSMA/CA) algorithm. A configuration of selecting a frequency and channel for use in the communication unit 213 will be described later in detail herein. The foregoing communication scheme is purely and thus the scope of the present invention is not limited to the specific communication scheme of the communication unit 213.

The communication unit 213 transmits a signal carrying information about the wireless power transmitter 200, and may unicast, multicast, or broadcast the signal. Table 1 below illustrates the data structure of a signal transmitted from the wireless power transmitter 200 according to an embodiment of the present invention. The wireless power transmitter 20 transmits a signal having the following frame structure at every predetermined interval. The signal is referred to as a Notice signal.

TABLE 1

| frame type | protocol version | sequence number | network ID | Rx to Report (schedule mask) | Reserved | Number of Rx |
|---|---|---|---|---|---|---|
| Notice | 4 bit | 1 byte | 1 byte | 1 byte | 5 bit | 3 bit |

The frame type field indicates the type of the signal. In Table 1, frame type indicates that the signal is a Notice signal. The protocol version field indicates the version of a communication protocol, including, for example, 4 bits. The sequence number field indicates the sequence of the signal, including, for example, 1 byte. For example, the sequence number is increased by 1 at each signal transmission and reception. The network IDentifier (ID) field provides the network ID of the wireless power transmitter 200, including 1 byte, for example. The Rx to Report (schedule mask) field indicates a wireless power receiver that will report to the wireless power transmitter 200, including, for example, 1 byte. Table 2 below illustrates the Rx to Report (schedule mask) field according to an embodiment of the present invention.

TABLE 2

| Rx to Report (schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

In Table 2, Rx1 to Rx8 a are one-to-one mapped to wireless power receivers 1 to 8. The Rx to Report (schedule mask) field is configured so that a wireless power receiver with the number of a schedule mask set to 1 is supposed to report to the wireless power transmitter 200.

The Reserved field is reserved for future use, for example, 5 bytes long. The Number of Rx field indicates the number of wireless power receivers around the wireless power transmitter 200, including 3 bits, for example.

A signal having the frame structure illustrated in Table 1 is assigned to Wireless Power Transmit (WPT) of the IEEE 802.15.4 data format. Table 3 illustrates the IEEE 802.15.4 data format.

TABLE 3

| Preamble | SFD | Frame Length | WPT | CRC16 |

In Table 3, the IEEE 802.15.4 data format includes Preamble, Start Frame Delimiter (SFD), Frame Length, WPT, and Cyclic Redundancy Code (CRC) 16 fields and the data structure illustrated in Table 1 corresponds to the WPT The communication unit 213 receives power information from the wireless power receiver 250. The power information includes at least one of information about the capacity of the wireless power receiver 250, a remaining battery indicator, information about the count of charging occurrences, battery consumption, battery capacity, and a battery charge/consumption ratio. The communication unit 213 transmits a charging function control signal to control the charging function of the wireless power receiver 250. The charging function control signal is used to enable or disable the charging function by controlling the power receiver 251 of the wireless power receiver 250.

The communication unit 213 receives signals, not only from the wireless power receiver 250, but also other wireless power transmitters (not shown). For example, the communication unit 213 receives, from a wireless power transmitter other than the wireless power transmitter 250, a Notice signal having the frame structure illustrated in Table 1.

While the power transmitter 211 and the communication unit 213 are separately configured in hardware and thus the wireless power transmitter 200 operates in an out-band fashion in FIG. 2A, this should not be construed as limiting the present invention. Thus, the power transmitter 211 and the communication unit 213 may be integrated into a single hardware device and thus the wireless power transmitter 200 may operate in an in-band fashion in accordance with an embodiment of the present invention.

The wireless power transmitter 200 and the wireless power receiver 250 transmit and receive various signals to and from each other. Accordingly, subscription of the wireless power receiver 250 to a wireless power network and charging of the wireless power receiver 250 through wireless power transmission and reception are performed under the control of the wireless power transmitter 200, which will be described later in detail herein.

Figure 2B:
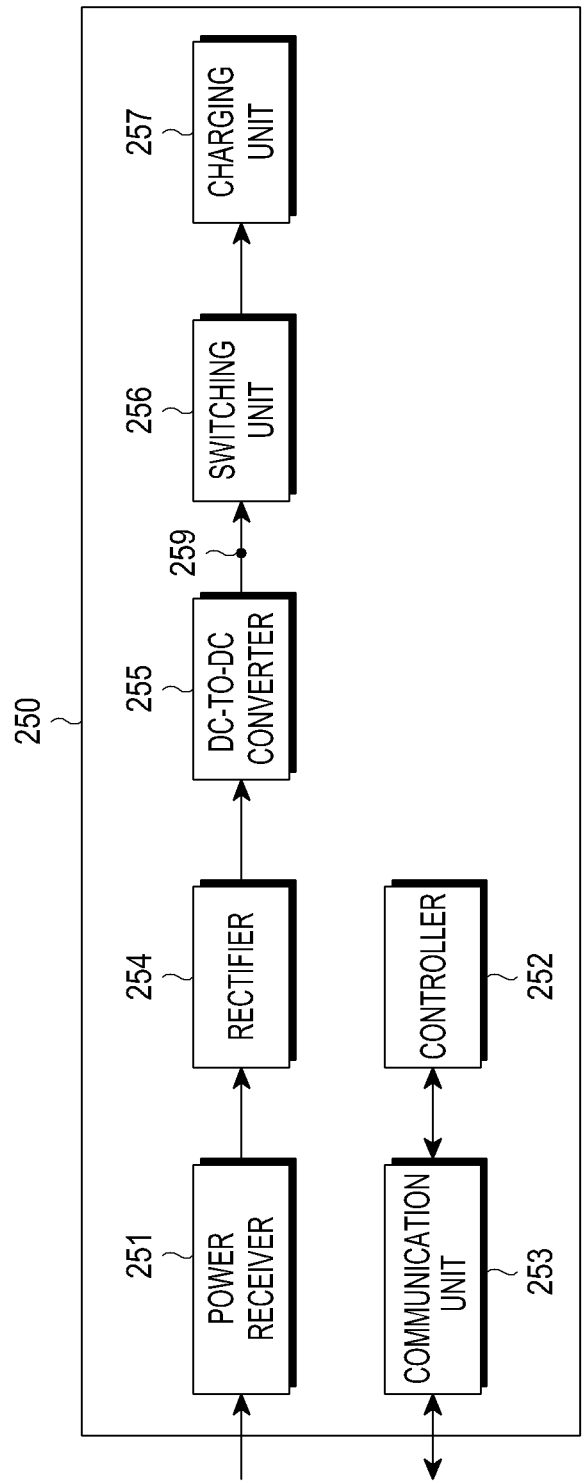
FIG. 2B illustrates a wireless power receiver according to an embodiment of the present invention.

FIG. 2B illustrates a wireless power receiver according to an embodiment of the present invention.

Referring to FIG. 2B, the wireless power receiver 250 includes a power receiver 251, a controller 252, a communication unit 253, a rectifier 254, a DC-to-DC converter 255, a switching unit 256, and a charging unit 257.

The power receiver 251, the controller 252, and the communication unit 253 operate in a manner similar to their counterparts of FIG. 2A. Therefor, a description of these components will be omitted herein for the sake of clarity and conciseness. The rectifier 254 rectifies wireless power received at the power receiver 251 into a DC format and is implemented with bridge diodes, for example. The DC-to-DC converter 255 converts the rectified power to have a predetermined gain.

For example, the DC-to-DC converter 255 converts the rectified voltage to 5V at its output end 259. However, the minimum and maximum values of a voltage to be applied to the front end (input end) of the DC-to-DC converter 255 are preset and the maximum and minimum values are recorded in Input Voltage MINimum (MIN) and Input Voltage MAXimum (MAX) fields of a request join signal, respectively, which are discussed later in detail. A rated voltage and a rated current at the output end 259 of the DC-to-DC converter 255 is recorded in Typical Output Voltage and Typical Output Current fields of the request join signal.

The switching unit 256 connects the DC-to-DC converter 255 to the charging unit 257. The switching unit 256 is kept in an ON or OFF state under the control of the controller 252. The charging unit 257 stores the converted power received from the DC-to-DC converter 255 when the switching unit 256 is in the ON state.

Figure 3:
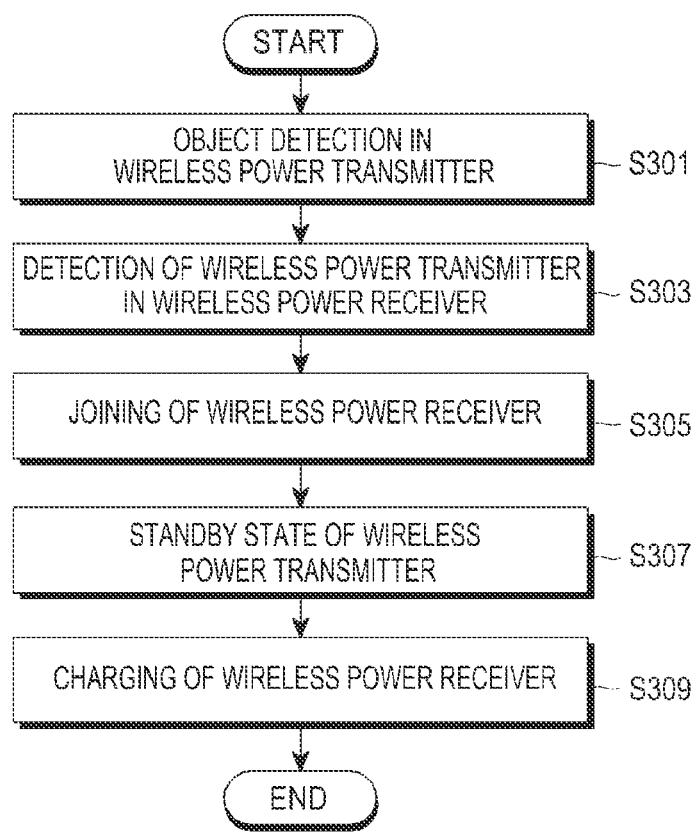
FIG. 3 illustrates a method of controlling a wireless power transmitter and a wireless power receiver according to an embodiment of the present invention.

FIG. 3 illustrates a method of controlling a wireless power transmitter and a wireless power receiver according to an embodiment of the present invention.

Referring to FIG. 3, the wireless power transmitter detects an object in the proximity of the wireless power transmitter in step S301. For example, the wireless power transmitter determines whether a new object is located near to the wireless power transmitter by detecting a load change. However, this is an example, and besides a load change, the wireless power transmitter may detect the existence of a nearby object based on various criteria including voltage, current, phase, and temperature. The various criteria will be described later in detail herein.

The wireless power receiver determines a wireless power transmitter from which to receive wireless power by scanning wireless power transmitters on at least one channel in step S303. For example, the wireless power receiver transmits a Search signal to one or more wireless power transmitters and selects a wireless power transmitter from which to receive wireless power based on Response Search signals received from the wireless power transmitters. In addition, the wireless power receiver is paired with the selected wireless power transmitter.

The wireless power receiver joins a wireless power network associated with the selected wireless power transmitter in step S305. For example, the wireless power receiver transmits a Request Join signal to the wireless power receiver and receives a Response Join signal from the wireless power transmitter. The Response Join signal includes information indicating join acceptance or rejection. Accordingly, the wireless power receiver may or may not be allowed to join the wireless power network depending on the Response Join signal.

The wireless power transmitter and the wireless power receiver enter a standby state in step S307, in which the wireless power transmitter transmits a Command signal to the wireless power receiver. The wireless power receiver replies to the wireless power transmitter with a Report signal or an ACKnowledgement (ACK) signal. If the Command signal includes a charge start command, the wireless power receiver begins charging in step S309.

Figure 4:
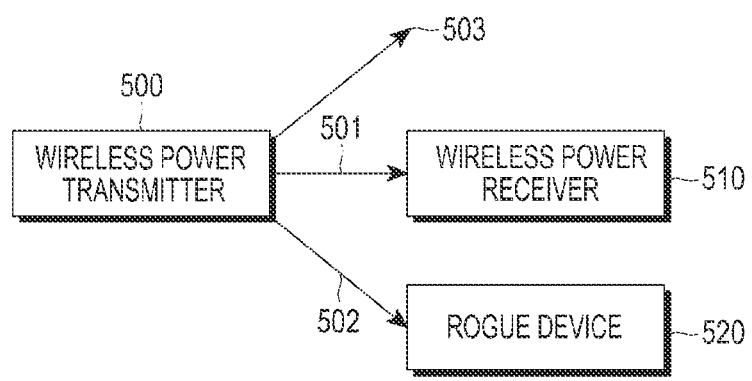
FIG. 4 illustrates wireless power transmission and reception between a wireless power transmitter and a wireless power receiver according to an embodiment of the present invention.

FIG. 4 illustrates wireless power transmission and reception between a wireless power transmitter and a wireless power receiver according to an embodiment of the present invention.

Referring to FIG. 4, a wireless power transmitter 500 transmits wireless power 501 to a wireless power receiver 510. Besides the wireless power receiver 510, a rogue device 520 is placed on the wireless power transmitter 500. The rogue device 520 is another wireless power receiver that is not allowed to receive wireless power. The rogue device 520 is a relatively small metal wireless power receiver.

The wireless power transmitter 500 detects the existence of the rogue device 520 by a load change. As described above with reference to FIG. 3, the wireless power transmitter 500 periodically applies a detection power to a coil. When the rogue device 520 is placed on the wireless power transmitter 500, the wireless power transmitter 500 detects a changed load value and thus determines the presence of the rogue device 520. Besides load, the wireless power transmitter 500 detects the existence of a nearby object based on many other criteria including voltage, current, phase, and temperature However, if the rogue device 520 is relatively fine, a change in load, voltage, current, phase, or temperature may not be distinguished from noise, and the wireless power transmitter 500 measures a constant power loss 503. If the power losses 502 and 503 exceed a threshold, the wireless power transmitter 500 determines the existence of the rogue device 520.

Once the rogue device 520 is placed on the wireless power transmitter 500, the power 502 is introduced to the rogue device 520. The sum of the power 501, 502 and 503 output from the wireless power transmitter 500 may be constant. The wireless power transmitter 500 supplies the driving power 501 to the wireless power receiver 510. If the rogue device 520 is added, the wireless power transmitter 500 also supplies the wireless power 502 to the rogue device 520. Mutual induction between the wireless power transmitter 500 and the wireless power receiver 503 results in power loss, and the power 503 is also lost from the wireless power transmitter 503 itself.

Without the rogue device 520, a power loss measurement of the wireless power transmitter 500 is equal to the power loss 503. With the rogue device 520, the power loss measurement of the wireless power transmitter 500 is the sum of the power 502 introduced to the rogue device 520 and the power loss 503. Accordingly, if the total power loss exceeds the threshold, the wireless power transmitter 500 determines the existence of the rogue device 520.

If determining the existence of the rogue device 520, the wireless power transmitter 500 controls its transmission power. For example, the wireless power transmitter 500 discontinues power transmission, such as until the rogue device 520 is removed. The wireless power transmitter 500 may output a warning message until the rogue device 520 is removed.

The wireless power transmitter 500 measures a power loss irrespective of the existence of the rogue device 520. The wireless power transmitter 500 measures a power loss periodically or continuously. If the power loss exceeds a threshold, the wireless power transmitter 500 controls transmission power. For example, the wireless power transmitter 500 may discontinue power transmission or reduce transmission power. The wireless power transmitter 500 may continue the transmission power control until the power loss drops to or below the threshold.

Figure 5:
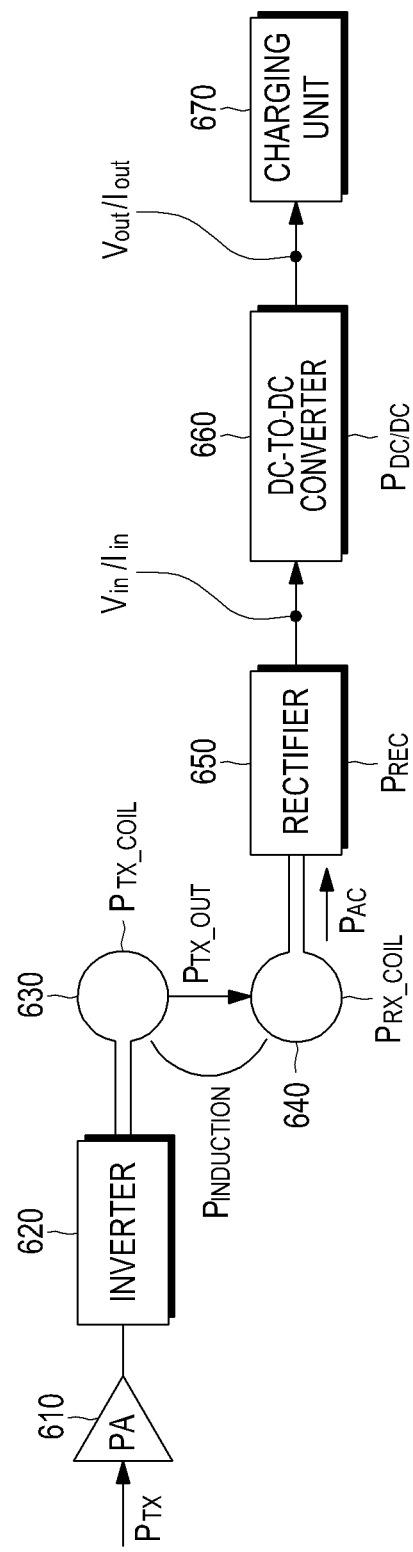
FIG. 5 illustrates power input and power output in a wireless power transmitter and a wireless power receiver.

FIG. 5 illustrates power input and power output in a wireless power transmitter and a wireless power receiver. Referring to FIG. 5, a power $P_{Tx}$ is supplied to a Power Amplifier (PA) 610 in the wireless power transmitter. An inverter 620 inverts a DC power received from the PA 610 to Alternating Current (AC) power. For example, the inverter 620 inverts a DC power to an AC power of a resonant frequency. A transmission resonator 630 resonates the AC power received from the inverter 620 and transmits the resonant power to a reception resonator 640 of the wireless power receiver. The transmission resonator 630 has a set resistance and reactance and thus experiences a power loss $P_{TX\_COIL}$. The transmission resonator 630 transmits a power $P_{TX\_OUT}$ to the reception resonator 640. Therefore, the relationship described in Equation (1) is established.

$$P_{TX\_OUT}=P_{TX}-P_{TX\_COIL} \qquad (1)$$

Mutual induction between the transmission resonator 630 and the reception resonator 640 may cause a power loss $P_{INDUCTION}$ during wireless power transmission and reception. In addition, the inductance of the reception resonator 640 may lead to a power loss $P_{RX\_COIL}$. A power $P_{AC}$ may be applied to a rectifier 650 and a power $P_{REC}$ may be lost in the rectifier 650. A DC-to-DC converter 660 loses a power $P_{DC/DC}$, and a charging unit 670 is charged with the remaining power. A voltage $V_{in}$ and a current $I_{in}$ are applied to the front end of the DC-to-DC converter 660 and a voltage $V_{out}$ and a current $I_{out}$ are output at the rear end of the DC-to-DC converter 660. The wireless power receiver may perceive a power $P_{ACK}$.

Therefore, the following Equations (2), (3) and (4) are given.

$$P_{ACK}=P_{AC}+P_{RX\_COIL}+P_{INDUCTION} \qquad (2)$$

$$P_{AC}=P_{REC}+V_{in}I_{in} \qquad (3)$$

$$V_{in}I_{in}=P_{DC/DC}+V_{out} \qquad (4)$$

The wireless power transmitter receives the power $P_{ACK}$ from the wireless power receiver. From the foregoing description, a power loss $P_{LOSS}$ is determined in Equation (5) by $$P_{LOSS}=P_{TX\_OUT}-P_{ACK} \qquad (5)$$

If the power loss $P_{LOSS}$ exceeds a threshold, the wireless power transmitter determines the existence of a rogue device in addition to the wireless power receiver.

When a plurality of wireless power receivers perform charging, the wireless power transmitter may also detect a rogue device. For example, the wireless power transmitter calculates a power loss based on the sum of power levels measured from the individual wireless power receivers and a power level output from the wireless power transmitter. For example, if first, second and third wireless power receivers are performing charging, the wireless power transmitter calculates a power loss by the following Equation (6).

$$P_{LOSS}=P_{TX\_OUT}-(P_{AC1}+P_{RX\_COIL1}+P_{INDUCION1})-(P_{AC2}+P_{RX\_COIL2}+P_{INDUCION2})-(P_{AC3}+P_{RX\_COIL3}+P_{INDUCION3}) \qquad (6)$$

where $P_{AC1}$ is a power input to a rectifier of the first wireless power receiver, $P_{RX\_COIL1}$ is a power lost in a reception resonator of the first wireless power receiver, $P_{INDUCTION1}$ is a power loss caused by mutual induction between the reception resonator of the first wireless power receiver and the transmission resonator of the wireless power transmitter, $P_{AC2}$ is a power input to a rectifier of the second wireless power receiver, $P_{RX\_COIL2}$ is a power lost in a reception resonator of the second wireless power receiver, $P_{INDUCTION2}$ is a power loss caused by mutual induction between the reception resonator of the second wireless power receiver and the transmission resonator of the wireless power transmitter, $P_{AC3}$ is a power input to a rectifier of the third wireless power receiver, $P_{RX\_COIL3}$ is a power lost in a reception resonator of the third wireless power receiver, and $P_{INDUCTION3}$ is a power loss caused by mutual induction between the reception resonator of the third wireless power receiver and the transmission resonator of the wireless power transmitter.

The wireless power transmitter determines whether there is a rogue device based on the measured power loss. If the power loss exceeds the threshold, the wireless power transmitter determines the existence of a rogue device.

The wireless power transmitter stores impedance information about the transmission resonator. The wireless power receiver transmits impedance information about the reception resonator and power loss information determined by the wireless power receiver to the wireless power transmitter. For example, the wireless power receiver transmits to the wireless power transmitter information about at least one of the power loss of the reception resonator, the power loss caused by mutual induction between the reception resonator and the transmission resonator of the wireless power transmitter, the input power or power loss rate of the rectifier, the current and voltage at the front end of the DC-to-DC converter, and the current and voltage at the rear end of the DC-to-DC converter.

The wireless power receiver transmits to the wireless power transmitter information about the impedance of the reception resonator, the power loss $P_{RX-COIL}$ of the reception resonator, the power loss $P_{INDUCTION}$ caused by mutual induction between the transmission resonator and the reception resonator, the power loss $P_{REC}$ of the rectifier, and the voltage $V_{in}$ and current $I_{in}$ at the front end of the DC-to-DC converter.

The wireless power receiver transmits, to the wireless power transmitter by a Search signal, a Request Join signal, or a Report signal, information about at least one of the impedance of the reception resonator, the power loss $P_{RX-COIL}$ of the reception resonator, the power loss $P_{INDUCTION}$ caused by mutual induction between the transmission resonator and the reception resonator, the power loss $P_{REC}$ of the rectifier, and the voltage $V_{in}$ and current $I_{in}$ at the front end of the DC-to-DC converter.

The Search signal is used to search for a wireless power transmitter from which a wireless power receiver will receive wireless power. For example, the Search signal has the data structure illustrated in Table 4.

TABLE 4

| Frame Type | Protocol Version | Sequence Number | Company ID | Product ID | Impedance | Category | Power Consumption |
|---|---|---|---|---|---|---|---|
| Search | 4 bits | 1 byte | 1 byte | 4 bytes | 4 bytes | 4 bits | 4 bits |

The wireless power transmitter measures the power loss based on the at least one of the stored impedance information about the transmission resonator, the power loss of the reception resonator, the input power of the rectifier, the current and voltage at the front end of the DC-to-DC converter, and the current and voltage at the rear end of the DC-to-DC converter.

The wireless power transmitter measures a power loss based on a power input to the PA, a power loss of the transmission resonator, a power loss of the reception resonator of the wireless power receiver, a power loss caused by mutual induction between the transmission resonator and the reception resonator, a power loss of the rectifier of the wireless power receiver, and a voltage and a current at the front end of the DC-to-DC converter of the wireless power receiver. For example, the wireless power transmitter measures a power loss in Equation (7), as follows.

$$P_{LOSS}=P_{TX}-P_{TX\_COIL}-P_{RX\_COIL}-P_{INDUCTION}-P_{REC}-I_{in}V_{in} \quad (7)$$

According to Equation (7), the wireless power transmitter calculates the power loss $P_{LOSS}$ by subtracting the power loss $P_{TX-COIL}$ of the transmission resonator, the power loss $P_{RX-COIL}$ of the reception resonator of the wireless power receiver, the power loss $P_{INDUCTION}$ caused by mutual induction between the transmission resonator and the reception resonator, the power loss $P_{REC}$ of the rectifier of the wireless power receiver, and the product between the voltage $V_{in}$ and current $I_{in}$ at the front end of the DC-to-DC converter of the wireless power receiver from the input power $P_{TX}$ of the PA of the wireless power transmitter.

The wireless power transmitter measures the power loss $P_{TX-COIL}$ of the transmission resonator based on the impedance of the transmission resonator. The wireless power receiver measures the power loss $P_{RX-COIL}$ of the reception resonator based on the impedance of the reception resonator.

In Table 4, Frame Type indicates the type of this signal. Herein, Frame Type indicates that the signal is a Search signal. Protocol Version indicates the type of a communication protocol, including 4 bits, for example. Sequence Number indicates the sequence of the signal, including 1 byte, for example. The sequence number is increased by 1, for example, at each signal transmission and reception. If the sequence number of the Notice signal illustrated in Table 1 is 1, the sequence number of the Search signal illustrated in Table 4 is 2.

Company ID provides information about a manufacturer of the wireless power receiver, including 1 byte, for example. The Product ID field provides product information about the wireless power receiver (e.g. a serial number of the wireless power receiver), including 4 bytes, for example. The Impedance field provides information about the impedance of the wireless power receiver, including 4 bits, for example. Information about the impedance of the reception resonator is set in the Impedance field. The category field specifies the rated power or size of the wireless power receiver, including 4 bits, for example. The Power Consumption field indicates a power loss estimated by the wireless power receiver, to which, for example, 4 bits is allocated. The Power Consumption field is filled with the individual ones or sum of the power loss $P_{RX-COIL}$ of the reception resonator, the power loss $P_{INDUCTION}$ caused by mutual induction between the transmission resonator and the reception resonator, and the power loss $P_{REC}$ of the rectifier. The Power Consumption field further includes information about the voltage $V_{in}$ and current $I_{in}$ at the front end of the DC-to-DC converter of the wireless power receiver.

The wireless power transmitter manages information about each wireless power receiver based on a Search signal received from the wireless power receiver. Table 5 is a device control table according to an embodiment of the present invention.

TABLE 5

| Session ID | Company ID | Product ID | Load Character | Current Character | Voltage Character | Efficiency Characteristic | Status Characteristic | Input Voltage | Output Voltage | Outpour Current | Impedance | Power consumption | Rectifier Efficiency |
|---|---|---|---|---|---|---|---|---|---|---|---|---|---|
| 1 | 0x111111 11 | 0x1111 11 | 25 | 300 mA | 5V | 75% | Complete & standby | — | 5V | 300 mA | 25 | 344 | 56 |
| 2 | 0x222222 22 | 0x1111 11 | 30 | 500 mA | 3V | 70% | Charge (CV) | 3V | 3V | 400 mA | 30 | 352 | 66 |
| 3 | 0x333333 33 | 0x2222 22 | 10 | 100 mA | 5V | 80% | Charge (CC) | 5V | 5V | 100 mA | 10 | 355 | 55 |
| 4 | 0x444444 44 | 0x1111 11 | 50 | 500 mA | 5V | 75% | Charge (CC) | 5V | 5V | 500 mA | 50 | 643 | 75 |
| 5 | 0x555555 55 | 0x3333 33 | 100 | 500 mA | 12V | 75% | Standby | — | 12V | 500 mA | 100 | 432 | 45 |

As noted from Table 5, a session IDentifier (ID), a manufacture ID, a product ID, a load characteristic, a current characteristic, a voltage characteristic, an efficiency characteristic, a current status, an input voltage at the front end of a DC-to-DC converter, and a current and voltage at the rear end of the DC-to-DC converter are managed for each wireless power receiver using the device control table. Current Status indicates a completely charged and standby status, a standby status due to incomplete charging, a charging in progress status in a Constant Voltage (CV) mode, or a charging in progress status in a Constant Current (CC) mode. In addition, the impedance, power consumption, rectifier efficiency of each wireless power receiver are managed in the device control table.

The wireless power transmitter transmits a search response signal to the wireless power receiver in response to the Search signal.

The search response signal may have the data structure of Table 6. Hereinbelow, the search response signal is referred to as a Response Search signal.

TABLE 6

| Frame type | Reserved | Sequence Number | Network ID |
|---|---|---|---|
| Response Search | 4 bits | 1 byte | 1 byte |

In Table 6, Frame Type indicates the type of this signal. Herein, Frame Type field indicates that the signal is a Response Search signal. The Reserved field is reserved for future use, to which for example 4 bits are allocated. Sequence Number indicates the sequence of the signal, including 1 byte for example. The sequence number is increased by 1 at each signal transmission and reception. The Network ID field indicates the network ID of the wireless power transmitter, including 1 byte, for example.

The wireless power receiver transmits a Request Join signal requesting joining in a wireless power transmission and reception network to the wireless power transmitter. The Request Join signal has the following data structure, shown in Table 7.

TABLE 7

| Frame Type | Reserved | Sequence Number | Network ID | Product ID | Input Voltage MIN | Input Voltage MAX | Typical Output Voltage | Typical Output Current | Impedance | Power Consumption |
|---|---|---|---|---|---|---|---|---|---|---|
| Request Join | 4 bits | 1 byte | 1 byte | 4 bytes | 1 byte | 1 byte | 1 byte | 1 byte | 4 bits | 4 bits |

Referring to Table 7, Frame Type indicates the type of the signal. Herein, Frame Type field indicates that the signal is a Request Join signal. The Reserved field is reserved for future use, to which for example 4 bits are allocated. Sequence Number is a field indicating the sequence of the signal, including 1 byte, for example. The sequence number is increased by 1 at each transmission and reception. The Network ID field indicates the network ID of the wireless power transmitter, including 1 byte, for example.

Product ID provides product information about the wireless power receiver, for example, the serial number of the wireless power receiver. Input Voltage MIN indicates a minimum voltage applied to the front end of the DC-to-DC converter of the wireless power receiver, including 1 byte, for example. Input Voltage MAX indicates a maximum voltage applied to the front end of the DC-to-DC converter of the wireless power receiver, including 1 byte, for example.

The Typical Output Voltage field indicates a rated voltage applied to the rear end of the DC-to-DC converter of the wireless power receiver, including 1 byte, for example. The Typical Output Current field indicates a rated current flowing through the rear end of the DC-to-DC converter of the wireless power receiver, including 1 byte, for example. The Impedance field provides impedance information about the wireless power receiver. The Power Consumption field provides the individual ones of sum of the power loss $P_{RX-COIL}$ of the reception resonator, the power loss $P_{INDUCTION}$ caused by mutual induction between the transmission resonator and the reception resonator, and the power loss $R_{REC}$ of the rectifier of the wireless power receiver. The Power Consumption field further provides information about the voltage $V_{in}$ and current $I_{in}$ at the front end of the DC-to-DC converter of the wireless power receiver.

In another embodiment of the present invention, the wireless power transmitter measures a power loss based on information about the input power of the PA, the power loss of the transmission resonator, the power loss of the reception resonator of the wireless power receiver, the power loss caused by mutual induction between the transmission resonator and the reception resonator, the power loss of the rectifier of the wireless power receiver, the power loss of the DC-to-DC converter, and the voltage and current at the rear end of the DC-to-DC converter. For example, the wireless power transmitter calculates the power loss by Equation (8).

$$P_{LOSS} = P_{TX} - P_{TX\_COIL} - P_{RX\_COIL} - P_{INDUCTION} - P_{REC} - P_{DC/DC} - I_{out} V_{out} \quad (8)$$

According to Equation (8), the wireless power transmitter calculates the power loss $P_{LOSS}$ by subtracting the power loss $P_{TX\text{-}COIL}$ of the transmission resonator, the power loss $P_{RX\text{-}COIL}$ of the reception resonator, the power loss $P_{INDUCTION}$ caused by mutual induction between the transmission resonator and the reception resonator, the power loss $P_{REC}$ of the rectifier, the power loss $P_{DC/DC}$ of the DC-to-DC converter, and the product between the voltage $V_{out}$ and current $I_{out}$ at the rear end of the DC-to-DC converter from the input power $P_{TX}$ of the PA.

The wireless power receiver periodically transmits a Report signal to the wireless power transmitter. For example, the Report signal has the data structure illustrated in Table 8.

TABLE 8

| Frame Type | Session ID | Sequence Number | Network ID | Input Voltage | Output Voltage | Output Current | Power Consumption |
|---|---|---|---|---|---|---|---|
| Report | 4 bits | 1 byte | 1 byte | 1 byte | 1 byte | 1 byte | 1 byte |

In Table 8, Frame type indicates the type of the signal. Herein, the Frame Type field indicates that the signal is a Report signal. The Session ID field indicates a session ID that the wireless power transmitter assigns to the wireless power receiver to control the wireless power network. 4 bits is allocated to the Session ID field. Sequence Number indicates the sequence of the signal, including 1 byte, for example. The Sequence Number is increased by 1, for example, at each signal transmission and reception. The Network ID field indicates the network ID of the wireless power transmitter, including 1 byte, for example. The Input Voltage field indicates a voltage applied to the front end of the DC-to-DC converter of the wireless power receiver, including 1 byte, for example.

The Output Voltage field indicates a voltage applied to the rear end of the DC-to-DC converter of the wireless power receiver, including 1 byte, for example. The Output Current field indicates a rated current applied to the rear end of the DC-to-DC converter of the wireless power receiver, including 1 byte, for example. The Power Consumption field is filled with the individual ones or sum of the power loss $P_{RX\text{-}COIL}$ of the reception resonator, the power loss $P_{INDUCTION}$ caused by mutual induction between the transmission resonator and the reception resonator, the power loss $P_{REC}$ of the rectifier of the wireless power receiver, and the power loss $P_{DC/DC}$ of the DC-to-DC converter.

Figure 6:
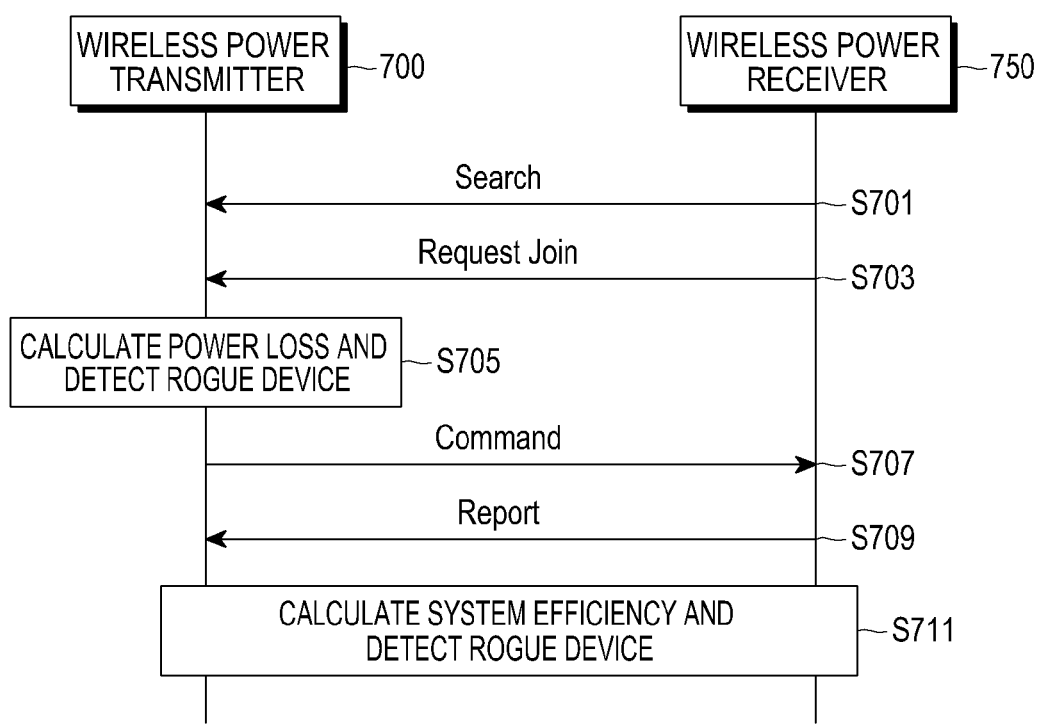
FIG. 6 illustrates a signal flow for signal transmission and reception between a wireless power transmitter and a wireless power receiver according to an embodiment of the present invention.

FIG. 6 illustrates a signal flow for signal transmission and reception between a wireless power transmitter and a wireless power receiver according to an embodiment of the present invention.

Referring to FIG. 6, a wireless power receiver 750 transmits a Search signal to a wireless power transmitter 700 in step S701. As described above, the Search signal carries information about a power loss of a reception resonator of the wireless power receiver 750, a power loss caused by mutual induction between a transmission resonator of the wireless power transmitter 700 and the reception resonator, a power loss of a rectifier of the wireless power receiver 750, and a voltage and current at the front end of a DC-to-DC converter of the wireless power receiver 750.

The wireless power receiver 750 transmits a Request Join signal to the wireless power transmitter 700 in step S703. As described above, the Request Join signal carries the information about the power loss of the reception resonator, the power loss caused by mutual induction between the transmission resonator and the reception resonator, the power loss of the rectifier in the wireless power receiver, and the voltage and current at the front end of the DC-to-DC converter. If the Search signal includes information about the impedance of the wireless power receiver 750, the Request Join signal carries information about the power consumption of the wireless power receiver 750.

Alternatively, if the Search signal carries the power consumption information about the wireless power receiver 750, the Request Join signal carries the impedance information about the wireless power receiver 750.

The power transmitter 700 measures a power loss $P_{LOSS}$ based on the information received from the wireless power receiver 750 and attempts to detect the rogue device in step S705. If the power loss $P_{LOSS}$ exceeds a threshold, the wireless power transmitter 700 determines that there is a rogue device.

The wireless power transmitter 700 transmits a Command signal to the wireless power receiver 750 in step S707. The Command signal has the data structure illustrated in Table 9.

TABLE 9

| Frame Type | Session ID | Sequence Number | Network ID | Command Type | Variable |
|---|---|---|---|---|---|
| Command | 4 bits | 1 byte | 1 byte | 4 bits | 4 bits |

In Table 9, Frame Type indicates the type of the signal. Herein, Frame Type indicates that this signal is a Command signal. The Session ID field indicates a session ID assigned to the wireless power receiver. For example, 4 bits are allocated to the Session ID field. The Sequence Number field indicates the sequence of the signal, including 1 byte, for example. The Sequence Number is increased by 1, for example, at each signal transmission and reception. The Network ID field indicates the network ID of the wires power transmitter, to which 1 byte is allocated, for example. Command Type specifies the type of the command, including 4 bits, for example. Variable is a complementary field to the Command Type field, including 4 bits, for example. The Command Type and Variable fields are configured in various manners as illustrated in Table 10.

TABLE 10

| Command Type | Variable |
| --- | --- |
| Charge Start | Reserved |
| Charge Finish | Reserved |
| Request Report | CTL level |
| Reset | Reset type |
| Channel Scan | Reserved |
| Change Channel | Channel |

Referring to Table 10, the Charge Start command requests the wireless power receiver to start charging. The Charge Finish command requests the wireless power receiver to end charging. The Request Report command requests the wireless power receiver to transmit a Report signal. Reset is an initialization command. Channel Scan is a channel scanning command. Channel Change is a channel change command.

The wireless power receiver begins charging based on the Command signal, such as by controlling an On-state of a switching unit between the DC-to-DC converter and a charging unit. The wireless power transmitter transmits a Command signal requesting reporting. This Command signal has Request Report as Command Type.

Upon receipt of the Command signal, the wireless power receiver 750 measures a current power status, generates a Report signal including information about the current power status based on the measurement and transmits the Report signal to the wireless power transmitter 700 in step S709.

The wireless power transmitter 700 calculates system efficiency and detects a rogue device based on the Report signal received periodically from the wireless power receiver 750 in step S711.

Figure 7:
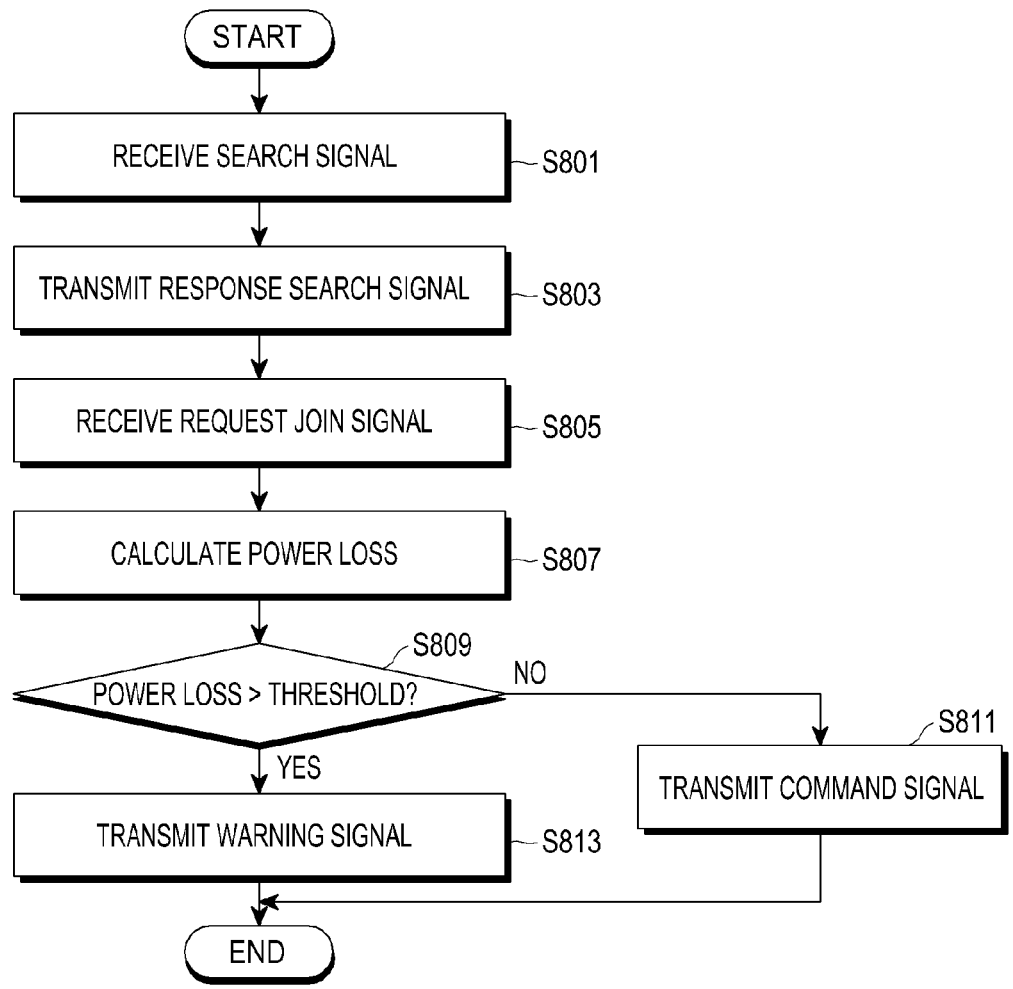
FIG. 7 illustrates a method of controlling a wireless power transmitter according to an embodiment of the present invention.

FIG. 7 illustrates a method of controlling a wireless power transmitter according to an embodiment of the present invention.

Referring to FIG. 7, the wireless power transmitter receives a Search signal from a wireless power receiver in step S801 and replies to the wireless power receiver with a Response Search signal in step S803. In step S805, the wireless power transmitter receives a Request Join signal from the wireless power receiver. The wireless power transmitter determines whether to allow the wireless power receiver to join, based on a device control table as illustrated above in Table 5.

The wireless power transmitter calculates a power loss based on information included in the Search signal and the Request Join signal in step S807. If the calculated power loss exceeds a threshold in step 809, the wireless power transmitter transmits a warning signal until a rogue device is eliminated, determining the existence of the rogue device in step S813. The warning signal is output visually and/or audibly, such as by a warning sound or Light Emitting Diode (LED) flicking. An error occurrence is indicated on a display (not shown). If the power loss is less than or equal to the threshold, the wireless power transmitter determines that the rogue device has been eliminated.

If the calculated power loss is less than or equal to the threshold in step S809, the wireless power transmitter transmits a Command signal requesting reporting to the wireless power receiver, determining the absence of a rogue device in step S811.

Figure 8:
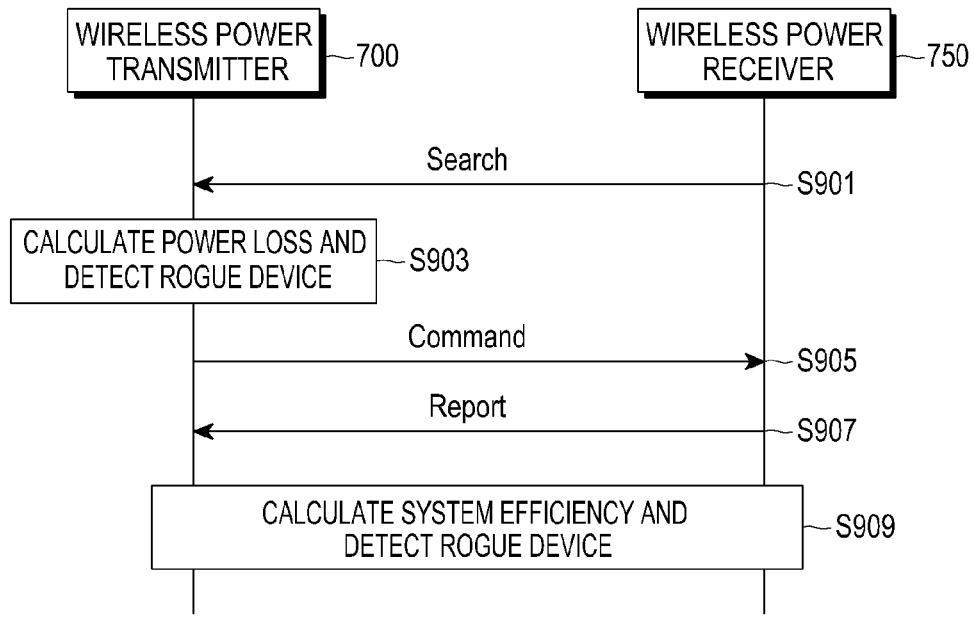
FIG. 8 illustrates a signal flow for signal transmission and reception between a wireless power transmitter and a wireless power receiver according to another embodiment of the present invention.

FIG. 8 illustrates a signal flow for signal transmission and reception between a wireless power transmitter and a wireless power receiver according to another embodiment of the present invention.

Referring to FIG. 8, the wireless power receiver 750 transmits a Search signal to the wireless power transmitter 700 in step S901. The Search signal carries information about the impedance and power loss of the wireless power receiver 750. The wireless power transmitter 700 calculates a power loss based on the received impedance information and power loss information and determines whether there is a rogue device in step S903. The wireless power transmitter 700 transmits a Command signal requesting reporting to the wireless power receiver 750 in step S905. The wireless power receiver 750 transmits a Report signal to the wireless power transmitter 700 in step S907. The report signal includes power information estimated by the wireless power receiver 750.

The wireless power transmitter 700 calculates system efficiency and detects a rogue device based on the Report signal received periodically from the wireless power receiver 750 in step S909.

Figure 9:
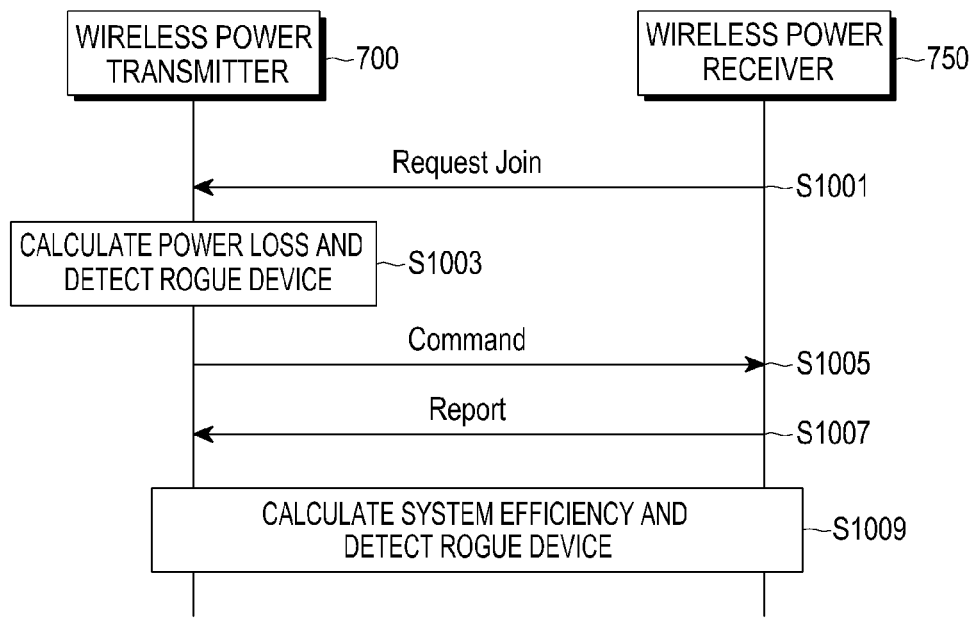
FIG. 9 illustrates a signal flow for signal transmission and reception between a wireless power transmitter and a wireless power receiver according to another embodiment of the present invention.

FIG. 9 illustrates a signal flow for signal transmission and reception between a wireless power transmitter and a wireless power receiver according to another embodiment of the present invention.

Referring to FIG. 9, the wireless power receiver 750 transmits a Request Join signal to the wireless power transmitter 700 in step S1001. The Request Join signal includes information about the impedance and power loss of the wireless power receiver 750 in the embodiment of the present invention. The wireless power transmitter 700 calculates a power loss based on the impedance information and power loss information included in the Request Join signal and determines whether there is a rogue device in step S1003. The wireless power transmitter 700 transmits a Command signal requesting reporting to the wireless power receiver 750 in step S1005. The wireless power receiver 750 transmits a Report signal in response to the Command signal to the wireless power transmitter 700 in step S1007.

The Report signal includes the individual values or sum of the voltage applied to the front end of the DC-to-DC converter of the wireless power receiver 750, the voltage and current applied to the rear end of the DC-to-DC converter, the power loss $P_{RX\text{-}COIL}$ of the reception resonator of the wireless power receiver 750, the power loss $P_{INDUCTION}$ caused by mutual induction between the transmission resonator and the reception resonator, the power loss $P_{REC}$ of the rectifier of the wireless power receiver 750, and the power loss $P_{DC/DC}$ of the DC-to-DC converter.

The wireless power transmitter 700 calculates system efficiency and detects a rogue device based on the Report signal received periodically from the wireless power receiver 750 in step S1009.

Figure 10:
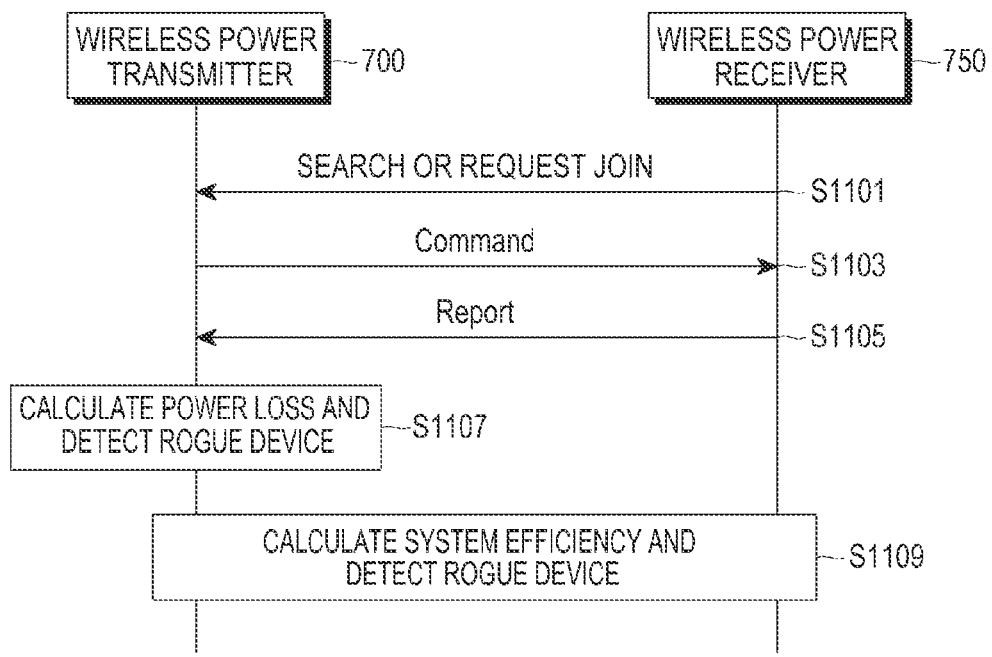
FIG. 10 illustrates a signal flow for signal transmission and reception between a wireless power transmitter and a wireless power receiver according to another embodiment of the present invention.

FIG. 10 illustrates a signal flow for signal transmission and reception between a wireless power transmitter and a wireless power receiver according to another embodiment of the present invention.

Referring to FIG. 10, the wireless power receiver 750 transmits a Search signal or a Request Join signal to the wireless power transmitter 700 in step S1101. The wireless power transmitter 700 determines whether to join the wireless power receiver 750 in a wireless power transmission and reception network. The wireless power transmitter 700 transmits a Command signal requesting reporting to the wireless power receiver 750 in step S1103. The wireless power receiver 750 transmits a Report signal in response to the Command signal to the wireless power transmitter 700 in step S1105. The report signal includes the individual values or sum of the voltage applied to the front end of the DC-to-DC converter, the voltage and current applied to the rear end of the DC-to-DC converter, the power loss $P_{RX\text{-}COIL}$ of the reception resonator, the power loss $P_{INDUCTION}$ caused by mutual induction between the transmission resonator and the reception resonator, the power loss $P_{REC}$ of the rectifier, and the power loss $P_{DC/DC}$ of the DC-to-DC converter.

The wireless power transmitter 700 calculates a power loss based on impedance information and power loss information included in the Report signal and detects a rogue device in step S1107. The wireless power transmitter 700 calculates system efficiency and detects a rogue device based on the Report signal received periodically from the wireless power receiver 750 in step S1109.

As is apparent from the above description, configurations and procedures of detecting a rogue device in a wireless power transmitter according to embodiments of the present invention are provided. Therefore, a rogue device can be detected more efficiently and more stably, thus preventing power waste.

The embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the embodiments of the present invention as described above.

Alternatively, one or more processors operating in accordance with stored instructions may implement the functions associated with the embodiments of the present invention as described above. If such is the case, it is within the scope of the present disclosure that such instructions are stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Functional computer programs, instructions, and instruction segments for accomplishing the present invention can be easily construed by programmers skilled in the art to which the present invention pertains.

While the invention has been shown and described with reference to certain embodiments thereof, it will be understood by those skilled in the art that various changes in form and details could be made therein without departing from the spirit and scope of the invention as defined by the appended claims and their equivalents.

What is claimed is:

1. A method of detecting a rogue device other than a wireless power receiver in a wireless power transmitter, the method comprising:
   receiving power consumption information about the wireless power receiver from the wireless power receiver, wherein the power consumption information includes information about at least one of a power dissipated in a reception resonator of the wireless power receiver, a power loss caused by induction of the wireless power receiver, and applied to a rectifier of the wireless power receiver;
   calculating a power loss based on the received power consumption information about the wireless power receiver; and
   if the power loss exceeds a threshold, shutting down power transmission to the wireless power receiver.

2. The method of claim 1, further comprising:
   determining that a rogue device exists on the wireless power transmitter, if the power loss exceeds the threshold;
   determining whether the rogue device has been eliminated from the wireless power transmitter after determining that the rogue device exists on the wireless power transmitter; and
   transmitting a warning signal until the rogue device is eliminated from the wireless power transmitter.

3. The method of claim 1, wherein the power consumption information further includes information about at least one of a power loss of a rectifier of the wireless power receiver, a power loss of a Direct Current (DC)-to-DC converter of the wireless power receiver, a voltage and a current at a front end of the DC-to-DC converter, and a voltage and a current at a rear end of the DC-to-DC converter.

4. The method of claim 1, wherein the calculating of the power loss is performed by calculating the power loss by subtracting the power dissipated in the reception resonator of the wireless power receiver, the power loss caused by induction of the wireless power receiver, and the power applied to the rectifier of the wireless power receiver from a power output from the wireless power transmitter.

5. The method of claim 4, wherein calculating of the power loss is further performed by calculating the power output from the wireless power transmitter by subtracting a power dissipated in a transmission resonator of the wireless power transmitter from a power input to the transmission resonator.

6. The method of claim 5, wherein calculating of the power loss is further performed by determining the power consumed in the transmission resonator based on an impedance of the transmission resonator and a current applied to the transmission resonator.

7. The method of claim 3, wherein calculating of the power loss is performed by calculating the power loss by subtracting the power loss of the reception resonator, the power loss caused by mutual induction, the power loss of the rectifier, the power loss of the DC-to-DC converter, and a product between the voltage and the current at the rear end of the DC-to-DC converter from a power output from the wireless power transmitter.

8. A wireless power transmitter that detects a rogue device other than a wireless power receiver, the wireless power transmitter comprising:
   a communication unit configured to receive power consumption information about the wireless power receiver from the wireless power receiver, wherein the power consumption information includes information about at least one of a power dissipated in a reception resonator of the wireless power receiver, a power loss caused by induction of the wireless power receiver, and power applied to a rectifier of the wireless power receiver; and
   a controller configured to:
   calculate a power loss based on the received power consumption information about the wireless power receiver, and
   shut down power transmission to the wireless power receiver, if the power loss exceeds a threshold.

9. The wireless power transmitter of claim 8, wherein the controller determines that a rogue device exists on the wireless power transmitter, if the power loss exceeds the threshold, determines whether the rogue device has been eliminated from the wireless power transmitter after determining that the rogue device exists on the wireless power transmitter, and controls transmission of a warning signal until the rogue device is eliminated from the wireless power transmitter.

10. The wireless power transmitter of claim 8, wherein the power consumption information further includes information about at least one of a power loss of a rectifier of the wireless power receiver, a power loss of a Direct Current (DC)-to-DC converter of the wireless power receiver, a voltage and a current at a front end of the DC-to-DC converter, and a voltage and a current at a rear end of the DC-to-DC converter.

11. The wireless power transmitter of claim 8, wherein the controller calculates the power loss by subtracting the power dissipated in the reception resonator of the wireless power receiver, the power loss caused by induction of the wireless power receiver, and the power applied to the rectifier of the wireless power receiver from a power output from the wireless power transmitter.

12. The wireless power transmitter of claim 11, wherein the controller calculates the power output from the wireless power transmitter by subtracting a power dissipated in a transmission resonator of the wireless power transmitter from a power input to the transmission resonator.

13. The wireless power transmitter of claim 12, wherein the controller determines the power consumed in the transmission resonator based on an impedance of the transmission resonator and a current applied to the transmission resonator.

14. The wireless power transmitter of claim 10, wherein the controller calculates the power loss by subtracting the power loss of the reception resonator, the power loss caused by mutual induction, the power loss of the rectifier, the power loss of the DC-to-DC converter, and a product between the voltage and the current at the rear end of the DC-to-DC converter from a power output from the wireless power transmitter.

15. A method of controlling a wireless power transmitter that transmits a charging power to a wireless power receiver, the method comprising:
 detecting existence of the wireless power receiver by applying a search power to the wireless power receiver, the search power being used to detect the existence of the wireless power receiver;
 transmitting a driving power to the wireless power receiver to drive the wireless power receiver;
 determining whether to join the wireless power receiver in a wireless power network, and joining the wireless power receiver in the wireless power network based on a result of the determining;
 transmitting a charging power to the wireless power receiver; and
 determining whether there is present a rogue device other than the wireless power receiver.

16. The method of claim 15, further comprising:
 receiving a search signal that searches for a wireless power transmitter from the wireless power receiver; and
 transmitting a search response signal, in response to the search signal, to the wireless power receiver.

17. The method of claim 16, wherein the search signal includes at least one of a protocol version, a sequence number, manufacturer information, product information, impedance information, capacity information, and power consumption information about the wireless power receiver.

18. The method of claim 17, wherein, if the search signal includes the power consumption information about the wireless power receiver, the power consumption information about the wireless power receiver includes information about at least one of a power loss of a reception resonator of the wireless power receiver, a power loss caused by mutual induction between the wireless power transmitter and the wireless power receiver, a power loss of a rectifier of the wireless power receiver, and a power loss of a Direct Current (DC)-to-DC converter of the wireless power receiver.

19. The method of claim 15, wherein joining the wireless power receiver in the wireless power network comprises:
 receiving a join request signal from the wireless power receiver; and
 transmitting a join response signal indicating whether the wireless power receiver will join the wireless power network to the wireless power receiver.

20. The method of claim 19, wherein the join request signal includes at least one of a sequence number, a network IDentifier (ID) of a wireless power transmitter from which to receive wireless power, product information, a maximum allowed voltage at a front end of a DC-to-DC converter of the wireless power receiver, a minimum allowed voltage at the front end of the DC-to-DC converter, a rated voltage at a rear end of the DC-to-DC converter, a rated current at the rear end of the DC-to-DC converter, and power consumption information about the wireless power receiver.

21. The method of claim 20, wherein, if the search signal includes the power consumption information about the wireless power receiver, the power consumption information about the wireless power receiver includes information about at least one of a power loss of a reception resonator of the wireless power receiver, a power loss caused by mutual induction between the wireless power transmitter and the wireless power receiver, a power loss of a rectifier of the wireless power receiver, and a power loss of the DC-to-DC converter of the wireless power receiver.

22. The method of claim 15, further comprising:
 transmitting a command signal requesting reporting of a power state of the wireless power receiver to the wireless power receiver; and
 receiving a report signal in response to the command signal from the wireless power receiver.

23. The method of claim 22, wherein the report signal includes at least one of a session Identifier (ID) of the wireless power receiver, a sequence number, a network ID of a wireless power transmitter from which to receive wireless power, a voltage at a front end of a DC-to-DC converter of the wireless power receiver, a voltage at a rear end of the DC-to-DC converter, a current at the rear end of the DC-to-DC converter, and power consumption information about the wireless power receiver.

24. The method of claim 23, wherein, if the search signal includes the power consumption information about the wireless power receiver, the power consumption information about the wireless power receiver includes information about at least one of a power loss of a reception resonator of the wireless power receiver, a power loss caused by mutual induction between the wireless power transmitter and the wireless power receiver, a power loss of a rectifier of the wireless power receiver, and a power loss of the DC-to-DC converter of the wireless power receiver.

25. The method of claim 15, wherein determining whether there is present a rogue device other than the wireless power receiver comprises detecting existence of a rogue device based on impedance information about the wireless power receiver included in a received search signal and power consumption information about the wireless power receiver included in a join request signal received when the wireless power receiver is to join a wireless power network.

26. The method of claim 25, further comprising, if the rogue device is present, calculating a wireless power transmission efficiency and continuously detecting the rogue device.

27. The method of claim 15, wherein determining whether there is present a rogue device other than the wireless power receiver comprises detecting existence of a rogue device based on power consumption information about the wireless power receiver included in a received search signal and impedance information about the wireless power receiver included in a join request signal received when the wireless power receiver is to join a wireless power network.

28. The method of claim 15, wherein determining whether there is present a rogue device other than the wireless power receiver comprises detecting existence of a rogue device based on impedance information and power consumption information about the wireless power receiver included in a received search signal.

29. The method of claim 15, wherein determining whether there is present a rogue device other than the wireless power receiver comprises detecting existence of a rogue device based on impedance information and power consumption information about the wireless power receiver included in a join request signal received when the wireless power receiver is to join a wireless power network.

30. The method of claim 15, further comprising:
transmitting a command signal requesting reporting of a power state of the wireless power receiver to the wireless power receiver; and
receiving a report signal in response to the command signal from the wireless power receiver,
wherein the determination of whether there is present a rogue device other than the wireless power receiver comprises detecting existence of a rogue device based on impedance information about the wireless power receiver included in a search signal or a join request signal received when the wireless power receiver is to join a wireless power network and power consumption information about the wireless power receiver included in the report signal.

\* \* \* \* \*